United States Patent
Doyle et al.

(10) Patent No.: US 9,143,623 B2
(45) Date of Patent: *Sep. 22, 2015

(54) METHOD AND APPARATUS FOR PROVIDING SEPARABLE BILLING SERVICES

(75) Inventors: Thomas F. Doyle, San Diego, CA (US); Craig Lauer, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

This patent is subject to a terminal disclaimer.

(21) Appl. No.: 13/283,803

(22) Filed: Oct. 28, 2011

(65) Prior Publication Data

US 2012/0041857 A1   Feb. 16, 2012

Related U.S. Application Data

(63) Continuation of application No. 10/633,143, filed on Jul. 31, 2003, now Pat. No. 8,060,419.

(51) Int. Cl.
*H04M 3/42*    (2006.01)
*H04M 15/00*   (2006.01)
*G07F 19/00*   (2006.01)
*G06Q 30/04*   (2012.01)
*H04L 12/14*   (2006.01)
*H04M 15/06*   (2006.01)
*H04M 15/16*   (2006.01)

(52) U.S. Cl.
CPC .............. *H04M 15/41* (2013.01); *G06Q 30/04* (2013.01); *H04L 12/14* (2013.01); *H04L 12/1457* (2013.01); *H04M 15/06* (2013.01); *H04M 15/16* (2013.01); *H04M 15/43* (2013.01); *H04M 15/8214* (2013.01); *H04M 2215/0164* (2013.01); *H04M 2215/22* (2013.01); *H04M 2215/782* (2013.01)

(58) Field of Classification Search
USPC .......................................... 705/34
See application file for complete search history.

(56) References Cited

U.S. PATENT DOCUMENTS 5,247,571 A * 9/1993 Kay et al. ................. 379/221.09
5,282,244 A   1/1994 Fuller et al.
(Continued)

FOREIGN PATENT DOCUMENTS

EP    0706743 A1    4/1996
EP    1296480 A1    3/2003

OTHER PUBLICATIONS

International Preliminary Report—PCT/US2004/024659, International Search Authority—IPEA/US—Alexandria Virginia—Feb. 20, 2006.

(Continued)

*Primary Examiner* — Ashford S Hayles
(74) *Attorney, Agent, or Firm* — Gerald P. Joyce, III (57) ABSTRACT

Methods and apparatus for providing separable billing services. In one embodiment, an apparatus comprises a memory for storing a data address associated with a first type of communication and a processor for receiving a data packet, the data packet comprising a destination data address. The processor compares the destination data address to the data address associated with the first type of communication, and routes the data packet to the destination data address if the destination data address matches the data address associated with the first type of communication and bills an account associated with the first type of communication.

29 Claims, 6 Drawing Sheets

(56) References Cited

U.S. PATENT DOCUMENTS

| | | | |
|---|---|---|---|
| 5,329,578 A * | 7/1994 | Brennan et al. | 379/211.03 |
| 5,561,706 A | 10/1996 | Fenner | |
| 5,754,633 A * | 5/1998 | Levy | 379/114.21 |
| 5,825,865 A * | 10/1998 | Oberlander et al. | 379/211.02 |
| 5,873,030 A * | 2/1999 | Mechling et al. | 455/408 |
| 5,987,325 A * | 11/1999 | Tayloe | 455/435.2 |
| 6,026,292 A * | 2/2000 | Coppinger et al. | 455/406 |
| 6,073,007 A | 6/2000 | Doyle | |
| 6,108,531 A | 8/2000 | Berg et al. | |
| 6,122,357 A * | 9/2000 | Farris et al. | 379/207.02 |
| 6,282,274 B1 * | 8/2001 | Jain et al. | 379/114.26 |
| 6,295,491 B1 | 9/2001 | Ayoub et al. | |
| 6,308,328 B1 * | 10/2001 | Bowcutt et al. | 725/111 |
| 6,580,367 B2 | 6/2003 | Roach | 340/471 |
| 6,584,500 B1 | 6/2003 | Arkko | 709/223 |
| 6,668,046 B1 * | 12/2003 | Albal | 379/119 |
| 6,757,371 B2 | 6/2004 | Kim et al. | |
| 6,795,856 B1 * | 9/2004 | Bunch | 709/224 |
| 6,879,838 B2 * | 4/2005 | Rankin et al. | 455/456.6 |
| 6,892,131 B2 * | 5/2005 | Coffee et al. | 701/482 |
| 6,925,160 B1 * | 8/2005 | Stevens et al. | 379/121.05 |
| 6,956,935 B2 * | 10/2005 | Brown et al. | 379/114.21 |
| 6,977,998 B2 * | 12/2005 | Brown et al. | 379/114.21 |
| 7,212,984 B2 | 5/2007 | Wolfe et a | |
| 7,269,251 B1 | 9/2007 | Jokinen | |
| 7,426,263 B2 | 9/2008 | Brown et al. | |
| 7,542,556 B2 * | 6/2009 | Bright et al. | 379/114.01 |
| 7,873,001 B2 * | 1/2011 | Silver | 370/329 |
| 7,917,394 B2 * | 3/2011 | Borelli et al. | 705/26.1 |
| 8,060,419 B2 | 11/2011 | Doyle et al. | |
| 2002/0026575 A1 * | 2/2002 | Wheeler et al. | 713/156 |
| 2002/0029197 A1 * | 3/2002 | Kailamaki et al. | 705/40 |
| 2002/0042715 A1 * | 4/2002 | Kelley | 705/1 |
| 2002/0090927 A1 * | 7/2002 | Allande et al. | 455/408 |
| 2002/0174335 A1 * | 11/2002 | Zhang et al. | 713/168 |
| 2002/0188562 A1 * | 12/2002 | Igarashi et al. | 705/40 |
| 2003/0083913 A1 * | 5/2003 | Wolfe et al. | 705/7 |
| 2003/0091171 A1 * | 5/2003 | Lopez Aladros et al. | 379/114.03 |
| 2003/0114141 A1 * | 6/2003 | Offer | 455/406 |
| 2003/0119479 A1 * | 6/2003 | Arima et al. | 455/408 |
| 2003/0123628 A1 * | 7/2003 | Rhodes | 379/114.01 |
| 2003/0144929 A1 * | 7/2003 | Wakamatsu | 705/30 |
| 2003/0182420 A1 * | 9/2003 | Jones et al. | 709/224 |
| 2004/0002324 A1 * | 1/2004 | Juntunen et al. | 455/406 |
| 2004/0022222 A1 | 2/2004 | Clisham | |
| 2004/0039504 A1 * | 2/2004 | Coffee et al. | 701/35 |
| 2004/0053599 A1 * | 3/2004 | Karaoguz et al. | 455/408 |
| 2004/0186812 A1 | 9/2004 | Back et al. | |
| 2004/0208151 A1 * | 10/2004 | Haverinen et al. | 370/338 |
| 2004/0242262 A1 * | 12/2004 | Turner | 455/550.1 |
| 2004/0259525 A1 * | 12/2004 | Kotzin | 455/406 |
| 2005/0086138 A1 * | 4/2005 | Prange | 705/34 |
| 2006/0041505 A1 * | 2/2006 | Enyart | 705/40 |
| 2006/0168303 A1 * | 7/2006 | Oyama et al. | 709/231 |
| 2008/0242289 A1 * | 10/2008 | Marui et al. | 455/422.1 |
| 2008/0242356 A1 * | 10/2008 | Marui et al. | 455/566 |
| 2010/0287237 A1 * | 11/2010 | Gross et al. | 709/204 |

OTHER PUBLICATIONS

International Search Report—PCT/US2004/024659, International Search Authority—European Patent Office—Feb. 20, 2004.

Wenjia Fang: "Building an accounting infrastructure for the internet," Global Telecommunications Conference 1996. The Key to Clobal Porsperity London, UK Nov. 18-22, 1996, IEEE XP10220161A, pp. 105-109, 1996.

Written Opinion—PCT/US2004/024659, International Search Authority—European Patent Office—Dec. 16, 2004.

* cited by examiner

METHOD AND APPARATUS FOR PROVIDING SEPARABLE BILLING SERVICES

CLAIM OF PRIORITY UNDER 35 U.S.C. §120

The present application for patent is a continuation of U.S. application Ser. No. 10/633,143, filed Jul. 31, 2003, which was issued as U.S. Pat. No. 8,060,419, and is incorporated herein by reference in its entirety.

BACKGROUND

I. Field

The methods and apparatus described herein relate to communication billing systems. More particularly, methods and apparatus are described for providing separable billing services for use with a packet-based communication system.

II. Description of the Related Art

Wireless networking has become commonplace in much of the world today. Typically, this involves transmitting and receiving packet data over a wireless communication network, such as a cellular, PCS, or satellite communication system. One such application involves the use of a mobile communication terminal, or MCT, located onboard a commercial vehicle such as a long-haul tractor-trailer. A vehicle operator may send and receive data communications using the MCT over a satellite communication network, for instance. A typical data application comprises accessing the Internet via the MCT or other data terminal.

A vehicle owner may equip the vehicle with an MCT so that the vehicle operator can access the Internet for business purposes. Such business related communications may include the need to report load status, location, and condition of a fleet vehicle, and/or instructions to the fleet driver as to the next desired destination. Typically, transmitting this type of information using mobile communications reduces the need for the vehicle driver to stop, and therefore increases fleet use efficiency. However, it may also be desirable to allow the vehicle operator to use the MCT for personal reasons as well for purposes of maintaining or establishing good relations between vehicle operators and vehicle owners.

The vehicle owner typically maintains an account with a wireless service provider relating to the use of the MCT. The wireless service provider typically bills this account in proportion to the amount of use of the wireless communication system. For example, in a satellite communication system, vehicle owners are typically charged each time a message is transmitted, as well as by the length of each message. Other wireless communication systems may charge vehicle owners on the basis of the amount of data transmitted or time used to transmit data.

In any case, there is presently no way for vehicle owners to distinguish between business and personal use of the MCT. Hence, there is a need for vehicle owners to distinguish between personal and business use of the MCT so that vehicle operators can be billed for their personal data networking usage.

SUMMARY

The ideas presented herein relate to methods and apparatus for providing separable billing services. In one embodiment, an apparatus for providing separable billing services comprises a memory for storing an identifier, the identifier identifying a digital processing device connected to a data network. The identifier is further assigned a communication type. In addition, the apparatus comprises a processor for receiving a data packet, the data packet comprising an address, the processor for comparing the address to the identifier and for adjusting an account associated with the communication type if the address matches the identifier.

In another embodiment, a method for providing separable billing services comprises receiving a data packet, the data packet comprising a first address identifying a digital processing device connected to a data network. The address is compared to an identifier stored in a memory, the identifier identifying one of such digital processing devices. The identifier is further assigned a communication type associated with a first type of communication. An account associated with the communication type is adjusted if the address matches the identifier.

In another embodiment, an apparatus for providing separable billing services comprises a signal-bearing medium tangibly embodying a program of machine-readable instructions executable by a digital processing apparatus to perform the method for providing separable billing services, the method comprising operations of receiving a data packet, the data packet comprising a destination data address, and comparing the destination data address to information identifying a first type of communication. The data packet is routed to the destination data address if the destination data address matches the data address associated with the first type of communication.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The ideas presented herein describe methods and apparatus for providing separable billing services in the context of a satellite communication system or a wireless terrestrial communication system in the transportation industry. However, it should be understood that the ideas presented herein could also be used in other types of wireless or wired communication systems including, but not limited to, landline communication systems (such as Public Switched Telephone Network communication systems). It should also be understood that the ideas presented herein could also be used in industries other than the transportation industry. In fact, these ideas could be used anytime there is a need to provide separable billing services to businesses or individuals.

Figure 1:
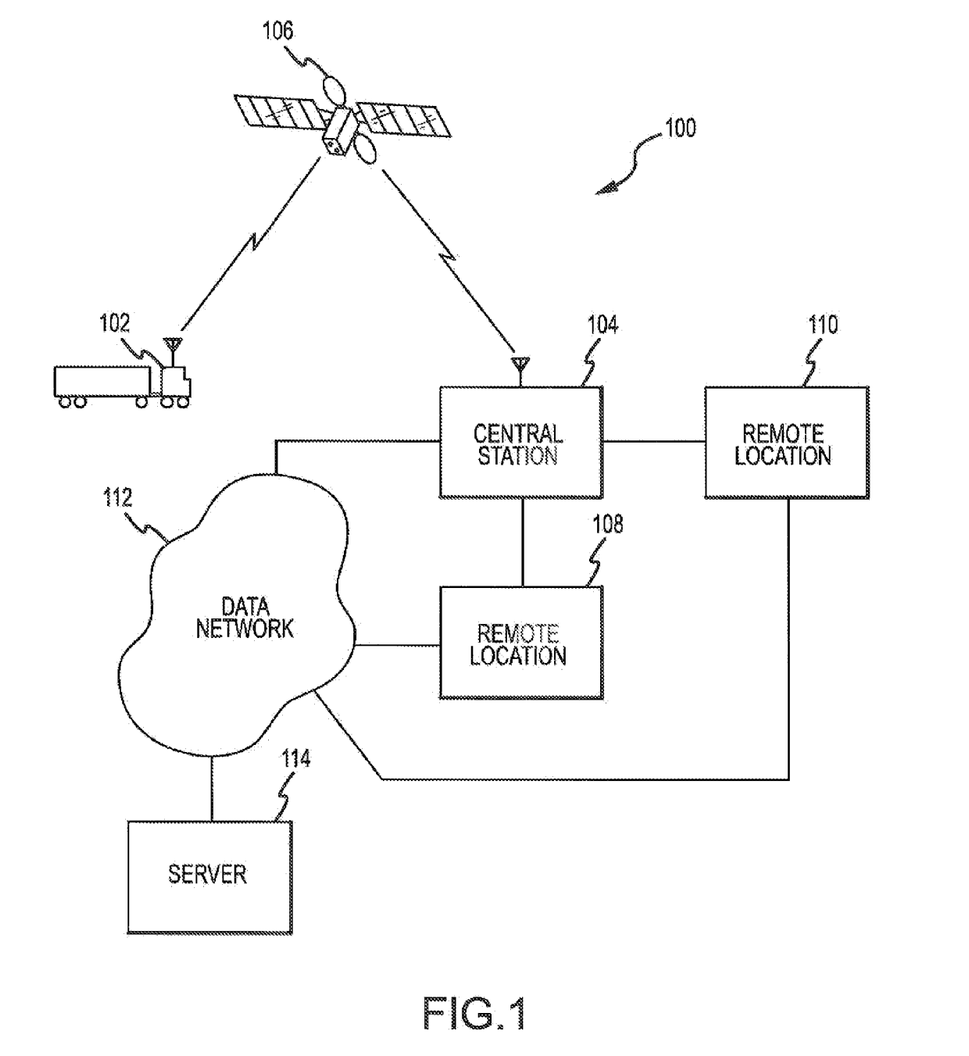
FIG. 1 illustrates a satellite-based wireless communication system in which the methods and apparatus for providing separable billing services are used.

FIG. 1 illustrates a satellite-based, wireless communication system 100 widely used in the trucking industry for allowing two-way communications between vehicle operators and others, such as a dispatch center, fleet management center, family members, governmental authorities, shippers, consignees, and so on. Vehicle 102, in this example, comprises a tractor-trailer, commonly used in the long-haul trucking industry. Vehicle 102 further comprises a mobile communication terminal (MCT, not shown) for communicating with a central station 104 via satellite 106. Generally, the MCT resides onboard a tractor portion of vehicle 102, in one embodiment. Central station 104 comprises a central processing center, otherwise known as a "hub" or network management center (NMC) and serves as a central communication point between MCT-equipped vehicles and their respective dispatch centers, other designated office(s), shippers, consignees, governmental authorities, family members, and so on. For example, in FIG. 1, central station 104 passes communications between remote location 108 and vehicle 102. Remote location 108 comprises a vehicle dispatch center which generally monitors and controls a fleet of vehicles 102.

Communications between remote location 108 and vehicle 102 may further be passed to one or more other remote locations, such as remote location 110. Remote location 110 comprises one of any number of interested third parties to communications between remote location 108 and vehicle 102. For example, remote location 110 might comprise another designated office of remote location 108, a shipper of goods being carried by vehicle 102, a consignee of goods being carried by vehicle 102, a governmental unit, and so on. Communications to and from vehicle 102 may additionally be routed to one or more servers 114, comprising a server, personal computer, data-capable telephone, or other digital processing device. Typically, server 114 comprises a web server for hosting a web site.

Communications among remote locations 104, 108, 110, and 114 may be routed directly to each other via dedicated links, such as telephone lines, T1 lines, microwave links, etc., or they may be routed through a data network 112, such as the Internet. A vehicle operator, or other vehicle occupant, may use the MCT for business purposes (i.e., to communicate with a remote location 108 or 110) or for personal purposes (i.e., to communicate with a family member via email, or to access a website hosted by server 114).

The MCT typically comprises a satellite modem with an interface for allowing a user to send and receive information. The information comprises voice and/or data information, i.e., pictures, maps, databases, executable software, facsimiles, and so on. The MCT, in an alternative or even accentuating embodiment, could comprise a wireless terrestrial modem, a data-capable wireless telephone, a personal digital assistant (PDA), a pager, a portable computer, or other wireless communication device.

The MCT, in the present example, is typically owned by the owner of vehicle 102. An account associated with the vehicle owner is typically maintained by a wireless service provider, for example, the owner of wireless communication system 100 or another entity, such as the owner of central station 104, in order for the wireless service provider to bill the vehicle owner for use of the wireless communication system. In this example, the vehicle operator also maintains an account with the wireless service provider so that he or she may be billed for personal communications over wireless communication system 100.

It is often desirable to differentiate between personal use and business use of the MCT so that the respective costs associated with each type of communication (business or personal) may be billed accordingly.

Figure 2:
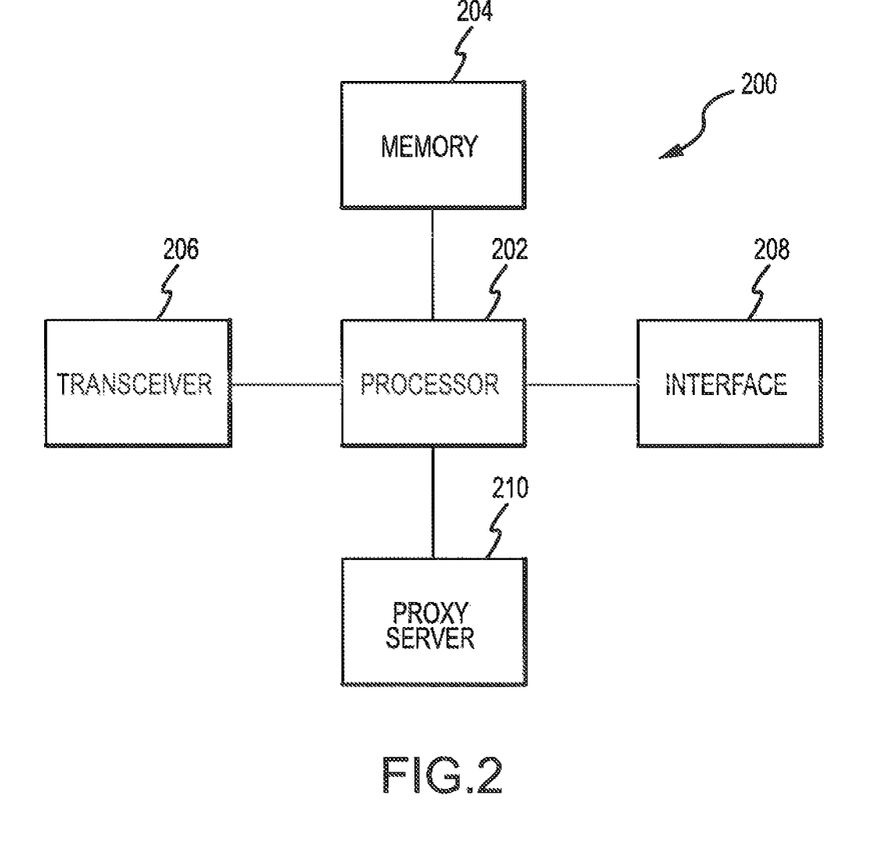
FIG. 2 illustrates a functional block diagram of an apparatus for providing separable billing services in an embodiment where information is received directly from a vehicle via the satellite communication system of FIG. 1.

FIG. 2 illustrates a functional block diagram of an apparatus 200 for providing separable billing services in an embodiment where information is received directly from vehicle 102 via, for example, satellite communication system 100. In this example, apparatus 200 is located at central station 104 and comprises a processor 202, a memory 204, a transceiver 206, and an interface 208. A proxy server 210 may also be included. It should be understood the functionality of these blocks may be combined into a single physical device, or their functionality may be distributed among multiple devices, the devices located at one or more locations and in communication with each other. Processor 202 generally comprises circuitry necessary for executing executable computer instructions stored in memory 204. For example, processor 202 may comprise a microprocessor and supporting circuitry, such as the Intel 80×86 or Pentium series of microprocessors. Of course, other electronic processors could be used in the alternative.

Memory 204 may comprise one or more volatile and/or non-volatile memories, such as a read-only memory (ROM), random-access memory (RAM), electrically erasable programmable read-only memories (EEPROM), hard drives, floppy disk drives and floppy disks, or flash memories. Memory 204 is used to store information relating to the operation of central station 104, information relating to communications to vehicle 102, instructions for providing separable billing services, and one or more identifiers associated with a various types of communication, for example, a business communication or a personal communication.

Transceiver 206 comprises circuitry to modulate and convert the data from processor 202 into high-frequency communication signals for wireless transmission to vehicle 102. Transceiver 206 is also used to convert received high frequency communication signals from vehicle 102, such as the request, into signals suitable for demodulation and subsequent processing by processor 202. Such circuitry is well-known in the art.

Each identifier stored in memory 204 identifies a particular server 114 connected to data network 112. For example, a server 114 could comprise a server hosting a website. The identifier may comprise a data address associated with the website, such as Internet Protocol (IP) address, a Universal Resource Locator (URL), a domain name, or other identifier.

Communications between vehicle 102 and a server 114 may be classified into a number of communication types. For example, a first type of communication could comprise a business-type communication, where information pertaining to business needs is communicated. A second type of communication could comprise a personal-type communication, where information pertaining to non-business needs is communicated. Of course, other types of communications could alternatively, or in addition, be defined. For example, a number of business-type communications could be defined, each for identifying a particular customer, for example. In another example, a number of personal-type communications could be defined, each for identifying a personal acquaintance of a vehicle operator. In another example, an "unknown"-type communication could be defined for communications that require further analysis to determine whether they are business or personal-type communications.

An example of a business-type communication is an Internet-compliant request sent by a vehicle operator over communication system 100 and data network 112 to provide mapping data to the vehicle operator in order to find his next pick-up or drop-off location. An example of a personal-type communication is an Internet-compliant request sent by the vehicle operator to provide airline information to the vehicle operator for purposes of planning his next vacation. Of course, the examples of both business-type and personal-type communications are endless.

An Internet-compliant request comprises a request to access a remote server connected to data network 112 for purposes of receiving data, such as viewing a website or retrieving/sending a data file, such as a picture, audio file, video file, email, text document, etc. The Internet-compliant request is formatted in accordance with standard data protocols used in data network 112, such as the Internet, and includes such protocols as hyper text transport protocol (HTTP), secure hyper text transport protocol (HTTPS), file transport protocol (FTP), simple mail transport protocol (SMTP), post office protocol (POP3), and others. Typically, an Internet-compliant request comprises a destination address which is simply an identification of a target resource, such as server 114, that a vehicle operator wishes to access. Server 114 generally hosts a website, or other means of providing/receiving information, and is generally identified by a universal resource locator (URL) that specifies a domain name or internet protocol (IP) address of server 114. The destination address, therefore, comprises a domain name or internet protocol (IP) address, or other means, for identifying the target server.

Typically, an owner of the MCT supplies memory 204 with one or more identifiers associated with each type of communication, and further assigns a communication type to each identifier. For example, an owner of an MCT could specify a domain name associated with a website used to provide status and instructions to vehicle 102. This domain name could be classified as a business-type identifier, so that any requests from vehicle 102 to access the website associated with that domain name would be labeled a business-type communication. Accordingly, an account associated with business-type communications would be debited by processor 202. An MCT owner could specify an unlimited number of identifiers, each assigned a communication type for identifying a particular type of communication. Memory 204 could comprise a number of identifiers classified as business-type addresses and a number of identifiers classified as personal-type addresses, as well as other addresses identifying other types of communications.

In a typical communication from vehicle 102, an Internet-compliant request is transmitted when a vehicle operator requests information from a server connected to data network 112. For example, a vehicle operator could use web browser software operating on the MCT to select a website to view, the website located at server 114. By using a pointing device, a "link" may be selected, and by doing so, a request to view the website is transmitted. In one embodiment, the request comprises an HTTP request that is transmitted via satellite 106 to central station 104 and received by processor 202 through transceiver 206. The HTTP request from vehicle 102 is typically formatted in accordance with one or more protocols used to deliver information over satellite communication system 100 for delivery to central station 104. The HTTP request typically comprises a destination address that identifies server 114.

The HTTP request is received by processor 202 through transceiver 206. In another embodiment, the HTTP request is received at a location other than central station 104 and then provided to central station 104 via generally known communication techniques such as wired or wireless data links, telephonic links, and so on. In this embodiment, the HTTP request is received through a transceiver 206, a secondary interface such as interface 208, or some other interface (not shown).

After receipt of the HTTP request by processor 202, the destination address contained therein is compared to a list of identifiers contained in memory 204. If a match is found, an account associated with the type of address in memory 204 is adjusted. For example, if the destination address matches an identifier listed as a business-type address in memory 204, an account associated with business-type communications is debited. In one embodiment, a query is transmitted to the business to verify if the business wishes to accept financial responsibility for a transaction. A transaction comprises a request and subsequent response from a resource for information. If a positive response is received, the query is provided to interface 208. If a negative response is received, a query may be sent to the user who sent the request, asking if the user would like to accept financial responsibility for the transaction. If so, then an account associated with the user is debited, and the query is provided to interface 208. In another embodiment, the user replies to the query with information specifying an a personal account to be debited for the transaction.

Account information is generally pre-stored within memory 204, associating various personal and business account holders with their respective logon information and/or MCTs. For example, prior to using an MCT, a vehicle operator typically "logs on" to the MCT by providing authentication information, such as a username and password. This information is transmitted to central station 102 and received by processor 202. An identification of the vehicle and/or MCT is also generally provided to processor 202 as well. Processor 202 can then associate personal requests for information from a particular MCT to a personal account held by the authenticated vehicle operator. Similarly, business transactions can be associated with a business account held by the owner of the MCT.

If no match is found, one or more actions are taken, such as debiting an account associated with a different type of communication, such as a personal-type communication, rejecting the request, rejecting the request and sending a query to the user alerting the user that the request failed and possibly querying the user for additional information, such as a valid account to charge to. Another possibility is to allow the request to continue to the destination address and bill a default account. In another embodiment, the account is not adjusted until a response to the request is received and processed by processor 202.

Once processor 202 completes the comparison, the request is provided to interface 208, where it is the provided to data network 112. Data network 112 routes the request to the destination address specified within the request, in this case server 114. In response to the request, server 114 transmits the requested information back to vehicle 102 via data network 112, satellite communication system 100, and, in one embodiment, central station 104.

The requested information is typically transmitted in data packets, in accordance with general data network protocols, such as TCP/IP or UDP. In one embodiment, the requested data is sent directly to vehicle 102 via data network 112 and wireless communication system 100. In another embodiment, the requested information is sent through data network 112, to central station 104, then to vehicle 102 through either interface 208 or through transceiver 206.

If the requested information is sent directly to vehicle 102, the data packets representing the requested information will have a destination address corresponding to vehicle 102. If the data packets are routed through central station 104, the data packets will have a destination address corresponding to proxy server 210. The advantage of sending requested information through central station 104 is that the requested information may be classified by processor 202 into business, personal, or other communication types, and billed accordingly.

For example, when data packets from server 114 are sent to central station 104 (specifically, proxy server 210), they are received by apparatus 200 via interface 208, where they are re-addressed by proxy server 210, processor 202, or both, to an address associated with the MCT onboard vehicle 102. The re-addressing might comprise generating new data packets in conformity with known data network protocols, such as TCP/IP or UDP, or it may involve formatting the information contained within the data packets to a format in conformance with wireless communication system 100, or both.

In one embodiment, processor 202 compares a source address contained in the data packets to the list of identifiers contained in memory 204. The source address identifies where the data packets originate from. In this example, the source of data packets is sever 114. The source address generally comprises an identification code, such as an internet protocol (IP) address, domain name, universal resource locator (URL), or other identification.

If a match is found between the source address and one of the identifiers stored in memory 204, an account associated with the type of address associated with the matching identifier is adjusted. If no match is found, one or more actions are taken, such as debiting an account associated with a different type of communication, such as a personal-type communication, rejecting the requested information, or allowing the requested information to continue to vehicle 102 and billing a default account.

Accounts may be billed in a number of alternative manners. For example, a fixed amount may be charged to an account based on the number of data packets matching the particular communication type received from a server, such as server 114. In another embodiment, a fixed amount may be charged to an account based on the number of requests received from vehicle 102. Numerous other billing arrangements could be used in the alternative.

Figure 3:
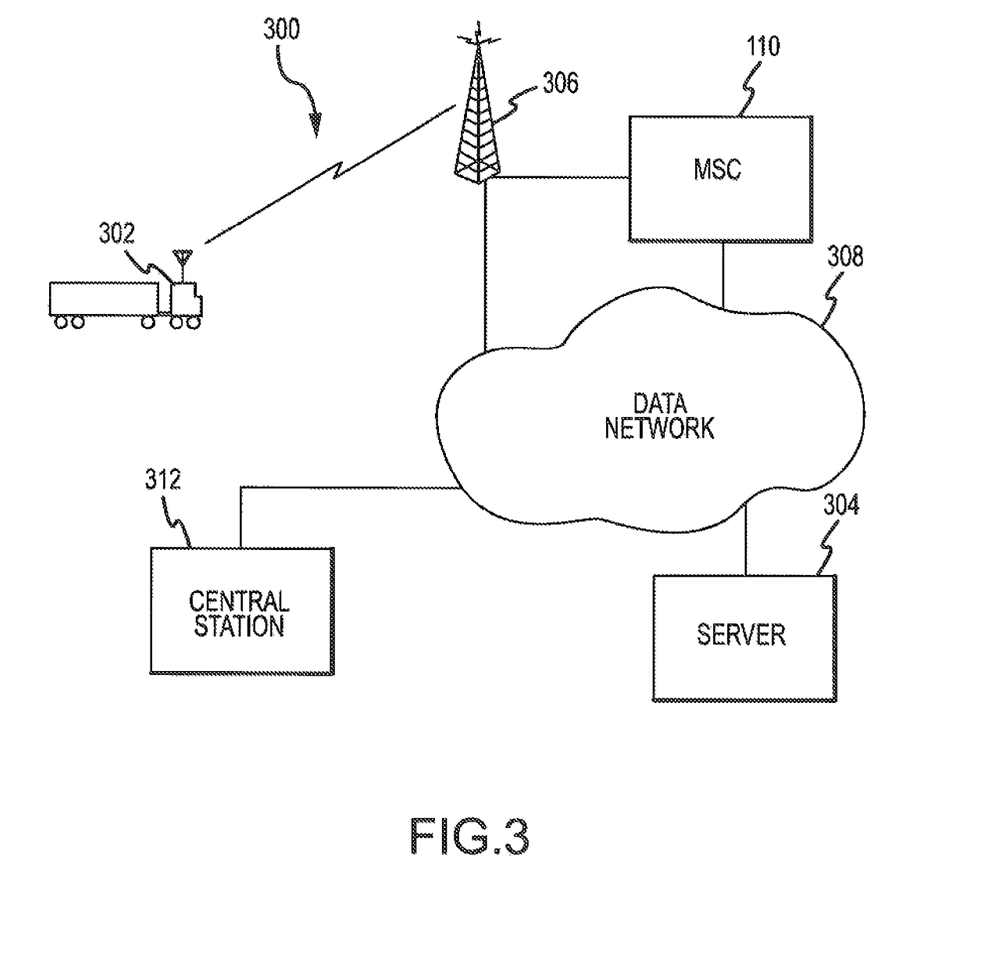
FIG. 3 illustrates an alternative embodiment for providing separable billing services in a wireless terrestrial communication system.

FIG. 3 illustrates an alternative embodiment for providing separable billing services in a wireless terrestrial communication system 300. In this embodiment, an Internet-compliant request is transmitted from vehicle 302 via the wireless terrestrial communication system 300, which, in turn, is coupled to data network 312. The Internet-compliant request is then routed to central station 304 for processing. In this embodiment, the Internet-compliant request comprises a first destination address corresponding to a proxy server located at central station 312 and a second destination address corresponding to server 314.

In general, the MCT located in vehicle 302 formats information for over-the-air transmission over wireless terrestrial communication system 300 in accordance with they type of communications offered by the communication system. For example, the MCT may format information in accordance with CDMA, TDMA, GSM, or other wireless communication protocols. These wireless communication protocols typically transmit information by using data packets or frames, each frame comprising the first destination address, for example, an address corresponding to proxy server 210. The second destination address is contained within the request itself and is typically generated by a software application running on the MCT. For example, the second destination address might comprise an identification of server 304 in an HTTP request generated by a web browser, such as Internet Explorer.

The request is transmitted by the MCT and received by base station 306. The request may then be sent directly to data network 308, or may be provided to mobile communication center (MSC) 310, where it is, in turn, provided to data network 308.

Figure 4:
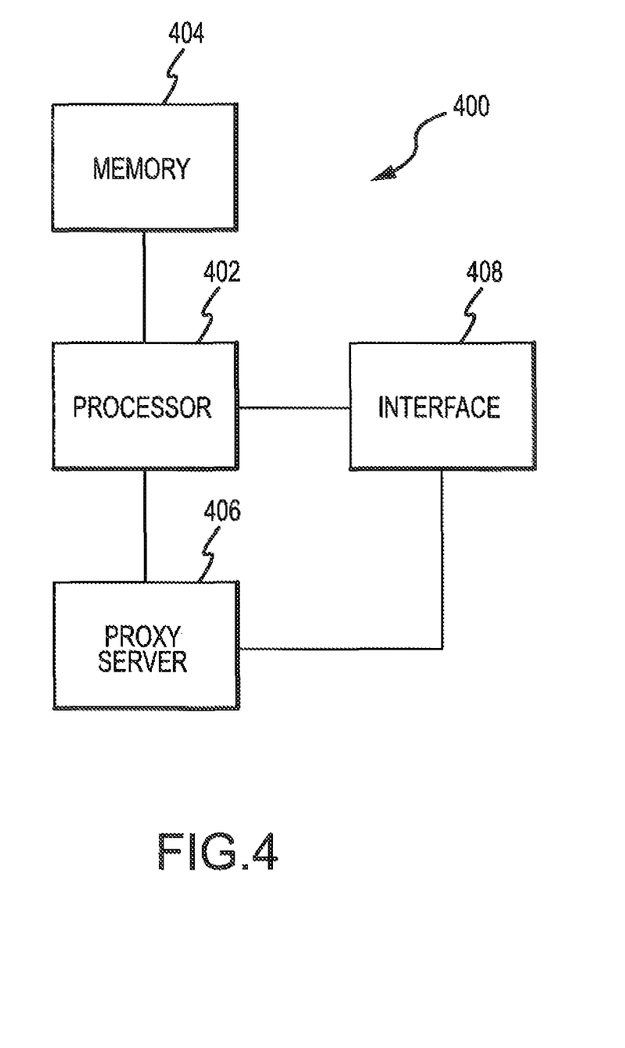
FIG. 4 illustrates a functional block diagram of an apparatus for providing separable billing services in an embodiment where information from a vehicle is received over a data network.

FIG. 4 illustrates a functional block diagram of an apparatus 400 for providing separable billing services in an embodiment where an Internet-compliant request for information from vehicle 302 is received over data network 308. The request is received by apparatus 400 through interface 408. Interface 408 allows processor 402 and/or proxy server 406 to communicate with server 304 over data network 308. Examples of external interface comprise a telephonic interface, an optical interface, a data interface (for example, a T1, T3, or the like), an internet interconnection device such as a router, a wireless transceiver, a modem, or a combination of these devices, as well as others.

An Internet-compliant request may be received from interface 408 by proxy server 406, where it is re-formatted into a second Internet-compliant request, the second Internet-compliant request comprising a destination address equal to the second destination address of the original request from vehicle 102, and a source address identifying proxy server 406.

Processor 402 compares either the second destination address in the original request or the destination address in the second Internet-compliant request to a list of identifiers contained in memory 404. If a match is found, an account associated with the type of identifier stored in memory 404 is adjusted. For example, if the destination address matches an identifier listed as a business-type address, an account associated with business-type of communications is debited. If no match is found, one or more actions are taken, such as debiting an account associated with a different type of address, such as an account associated with a personal-type communication, rejecting the request, or allowing the request to continue to the destination address and billing a default account.

Various queries may be sent to account holders during various phases of the transaction. Such queries generally provide information about the status of the request. For example, if a request fails, i.e., it's destination address does not match any address found in memory 404, a query may be sent to a vehicle operator who originated request, alerting the vehicle operator that the request failed. Additionally, the query may ask the vehicle operator to provide a valid account number in order to complete the transaction. If an account number is sent by the vehicle operator in response to the query, processor 202 authenticates the account number and, if validated, bills that account accordingly as the request is sent to its destination via interface 208. Similarly, after a request (or a response) is deemed to be business or personal, a query may be sent to the account holder about to be billed, asking whether or not to accept financial responsibility for the transaction. If so, then the appropriate account is billed for the transaction. If not, the request (or response) is not provided to its destination.

Once processor 402 completes the comparison, the second request is generally provided to interface 408, where it is sent to data network 308. Data network 308 routes the second request to the destination address specified within the second request, in this case server 304. In response to the second request, server 304 transmits the requested information back to vehicle 302 via data network 308, central station 312, and wireless terrestrial communication system 300.

The requested information is typically transmitted in data packets, in accordance with general data network protocols, such as TCP/IP or UDP, over data network 308 and received by proxy server 406 via interface 408. Each of the data packets representing the requested information typically comprise a source address corresponding to an identification of server 304, for example, and a destination address identifying proxy server 406.

Processor 402 compares the source address contained in the data packets to the list of identifiers contained in memory 404. The source address generally comprises an identification code, such as an internet protocol (IP) address, domain name, universal resource locator (URL), or other identification.

If a match is found between the source address and one of the identifiers stored in memory 404, an account associated with the type of address is adjusted, the account being related to the particular MCT to which the requested information is being sent. If no match is found, one or more actions are taken, such as debiting an account associated with a different type of address, such as an address associated with a personal-type communication, rejecting the requested information, or allowing the requested information to continue to vehicle 302 and billing a default account. Other possibilities are described above with respect to FIG. 2 and FIG. 3.

Proxy server 406 finally re-addresses the data packets representing the requested information into new data packets having a source address of proxy server 406 and a destination address corresponding to vehicle 302. The new data packets are then provided to interface 408, and onto vehicle 302 via data network 308 and wireless terrestrial communication system 300.

Figure 5:
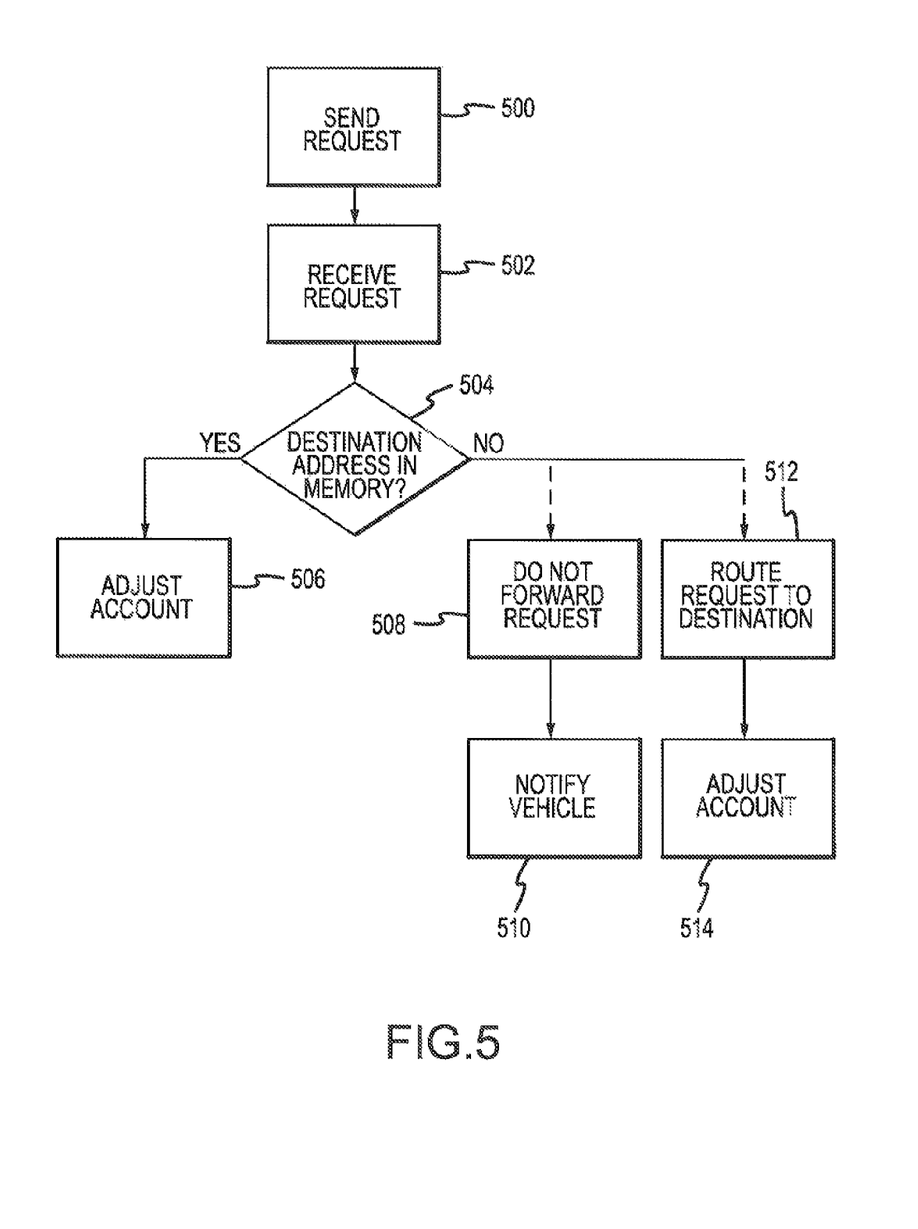
FIG. 5 is a flow diagram illustrating one method for providing separable billing services.

FIG. 5 is a flow diagram illustrating one method for providing separable billing services. In step 500, an Internet-compliant request comprising one or more data packets is sent from a vehicle over a wireless communication system. The data packets representing the request comprise a destination address identifying a server or other device holding desired information.

In step 502, the Internet-compliant request is received by an apparatus located at a central station, the apparatus for providing separable billing services.

In step 504, a processor compares the destination data address found in the request to a list of identifiers contained in a memory. Each of the identifiers correspond to a destination, such as a server connected to a data network. If the destination data address found in the request matches an identifier in the memory, an account associated with a particular type of address is adjusted, as shown in step 506. The account that is adjusted corresponds to a particular type of communication. For example, if the request matches an identifier which has been pre-designated as a business-type address, an account belonging to a vehicle owner could be debited. If the request matches an identifier which ahs been pre-designated as a personal-type address, an account belonging to the vehicle operator could be debited.

If a match is not found, then one of several possible actions are taken by the processor, as shown in steps 508-514. One action could be that the processor does not forward the request to the destination address, as shown in step 508. In conjunction with this action, the processor may send a message back to the vehicle indicating that the request was not completed, as shown in step 510. Another possible action is for the processor to route the request to the destination, and adjust an account associated with a second communication type, as shown in steps 512 and 514. For example, if a vehicle owner owns an account relating to the first type of communication (i.e. a business communication), and a second account is held by a vehicle operator for personal communications, the vehicle operator's account could be debited if the destination address does not match one of the identifiers in the memory (in this example, the only identifiers stored in the memory are those associated with business communications, i.e., websites pre-designated as business-related websites).

Figure 6:
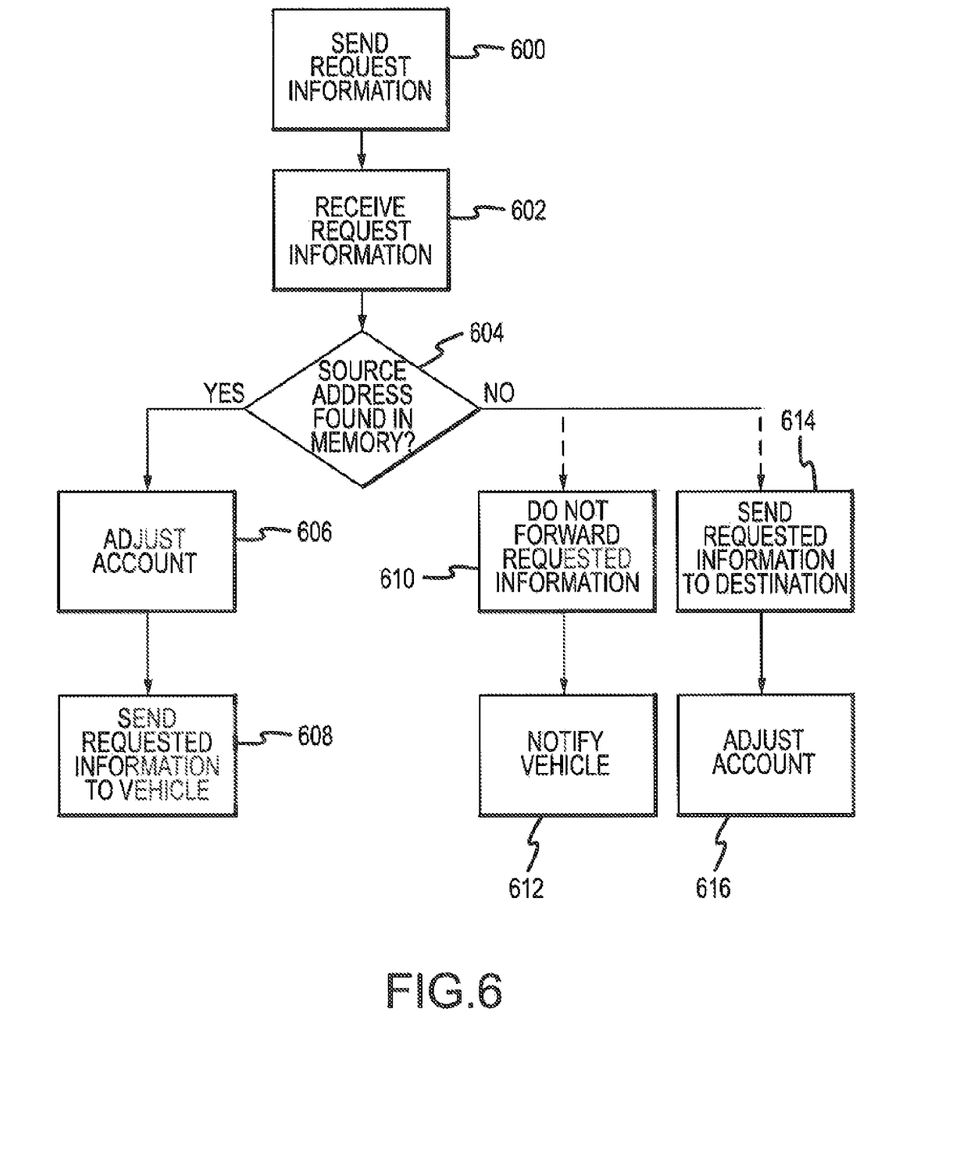
FIG. 6 illustrates a flow diagram showing a method for providing separable billing services for information sent from a server to a vehicle.

FIG. 6 illustrates a flow diagram illustrating a method for providing separable billing services for information sent from a server to a vehicle. A signal-bearing medium tangibly embodying a program of machine-readable instructions executable by a digital processing apparatus, such as processor 202 or 402, may be used to provide separable billing services. In step 600, requested information is sent from a server, such as a computer hosting a website. The requested information is generally in response to a request for information sent by an operator of the vehicle. The requested information typically comprises data packets, each of the data packets comprising a source address corresponding to an identity of the server, and a destination address corresponding to an identity of the vehicle initiating the request, or a proxy server located at a central station.

In step 602, the requested information is received at the central station and provided to a processor and/or a proxy server. In step 604, the processor compares the source address contained within the requested information to one or more identifiers stored in a memory. If a match between the source address and a stored identifier is found, an account associated with the type of matching identifier in the memory is adjusted, as shown in step 606. The requested information is then sent to the vehicle that requested the information, as shown in step 608. The proxy server may have to re-format the requested information to either comply with a wireless communication protocol, and/or to re-address the requested information to the vehicle that requested the information.

In other embodiments, the determination of whether the requested information is business or personal may depend on alternative or additional factors. For example, processor 202 may consider the length or number of data packets comprising the requested information, or it may consider identifiers, such as metatags, key words, or other information contained within the requested information to supplement the decision process.

If a match is not found, then one of several possible actions are taken by the processor, as shown in steps 610-614. One action could be that the processor does not forward the requested information to the vehicle, as shown in step 610. Optionally, in step 612, a message is transmitted to the vehicle alerting the operator that the requested information is not being sent. Another possible action is for the processor to route the requested information to the vehicle that requested the information, and adjust an account associated with a second communication type, as shown in steps 614 and 616. For example, if a vehicle owner owns an account relating to the first type of communication (i.e. a business communication), and a second account is held by a vehicle operator for personal communications, the vehicle operator's account could be debited if the source address does not match one of the identifiers in the memory (in this example, the only identifiers stored in the memory are those associated with personal communications, i.e., websites pre-designated as personal-related websites).

The previous description of the preferred embodiments is provided to enable any person skilled in the art to make and use the present invention. The various modifications to these embodiments will be readily apparent to those skilled in the art, and the generic principles defined herein may be applied to other embodiments without the use of the inventive faculty. Thus, the present invention is not intended to be limited to the embodiments discussed herein, but is to be accorded the widest scope consistent with the principles and novel features disclosed herein.

What is claimed is:

1. An apparatus for providing separable billing services, comprising:
a memory for storing a set of identifiers, each of the set of the identifiers identifying one or more digital processing devices connected to a data network, and each identifier being assigned a communication type; and
a processor for:
receiving over communication network, a data packet, the data packet comprising an address;
reformatting the received data packet into a complaint request comprising a destination address that correspond to a second destination address of the received data packet and a source address identifying a server;
comparing the address to one of the set of identifiers;
transmitting a query via a communication interface to a server to verify whether financial responsibility for a transaction will be accepted, and an account associated with the communication type should be adjusted; and
adjusting the account associated with the communication or another account based on the verification.

2. The apparatus of claim 1, further comprising an interface for routing said data packet to a destination associated with the address.

3. The apparatus of claim 1, wherein the communication type comprises a business-type communication.

4. The apparatus of claim 1 wherein the address comprises a destination address.

5. The apparatus of claim 1 wherein the address comprises a source address.

6. The apparatus of claim 1, wherein the processor is further configured for adjusting a second account, wherein the second account is associated with a different communication type, if the address does not match the one of the set of identifiers.

7. The apparatus of claim 6, wherein the different communication type comprises a personal-type communication.

8. The apparatus of claim 1, wherein the data packet is not forwarded to the one or more digital processing devices if the address does not match the one of the set of identifiers.

9. The apparatus of claim 1, further comprising a transceiver for transmitting a message to an originator of the data packet informing the originator that the data packet was not sent to the one or more digital processing devices if the address does not match the one of the set of identifiers.

10. A method for providing separable billing services, comprising:
receiving by a server, over a communication network, a data packet at a processor of the server, the data packet comprising an address identifying a digital processing device connected to a data network;
reformatting by the server, the received data packet into a complaint request comprising a destination address that correspond to a second destination address of the received data packet and a source address identifying the server;
comparing by the processor of server, the address to a set of identifiers stored in a memory of the server, each of the set of the identifiers identifying one of a plurality of digital processing devices, and each identifier being assigned a communication type;
transmitting a query by the processor of the server, via a communication interface, to another server to verify whether financial responsibility for a transaction will be accepted, and an account associated with the communication type should be adjusted; and
adjusting by the processor of the server, the account associated with the communication type or another account based on the verification.

11. The method of claim 10, wherein the communication type comprises a business-type communication.

12. The method of claim 10, wherein the communication type comprises a personal-type communication.

13. The method of claim 10, further comprising routing the data packet to the digital processing device if the address matches the one of the set of identifiers.

14. The method of claim 10 wherein the address comprises a destination address.

15. The method of claim 10 wherein the address comprises a source address.

16. The method of claim 10 further comprising:
adjusting a second account, wherein the second account is associated with a different communication type, if the address does not match the one of the set of identifiers.

17. The method of claim 10, further comprising transmitting a message to an originator of the data packet informing the originator that the data packet was not sent to the digital processing device if the address does not match the one of the set of identifiers.

18. A non-transitory machine-readable medium comprising instructions executable by a digital processing apparatus to perform a method for providing separable billing services, the instructions comprising codes for:
receiving over a communication network, a data packet, the data packet comprising an address identifying a digital processing device connected to a data network;
reformatting the received data packet into a complaint request comprising a destination address that correspond to a second destination address of the received data packet and a source address identifying a server;
comparing the address to a set of identifiers stored in a memory, each of the set of the identifiers identifying one of a plurality of digital processing devices, and each identifier being assigned a communication type;
transmitting a query via a communication interface to a server to verify whether financial responsibility for a transaction will be accepted, and an account associated with the communication type should be adjusted; and
adjusting the account associated with the communication type or another account based on the verification.

19. The non-transitory machine-readable medium of claim 18, wherein the communication type comprises a business-type communication.

20. The non-transitory machine-readable medium of claim 18, wherein the communication type comprises a personal-type communication.

21. The non-transitory machine-readable medium of claim 18, further comprising codes for routing the data packet to the digital processing device if the address matches the one of the set of identifiers.

22. The non-transitory machine-readable medium of claim 18 wherein the address comprises a destination address.

23. The non-transitory machine-readable medium of claim 18 wherein the address comprises a source address.

24. The non-transitory machine-readable medium of claim 18 further comprising codes for:

adjusting a second account, wherein the second account is associated with a different communication type, if the address does not match the one of the set of identifiers.

25. The non-transitory machine-readable medium of claim 18, further comprising codes for transmitting a message to an originator of the data packet informing the originator that the data packet was not sent to the digital processing device if the address does not match the one of the set of identifiers.

26. An apparatus for providing separable billing services, comprising:
   receiving means for receiving over a communication network, a data packet, the data packet comprising an address identifying a digital processing device connected to a data network;
   reformatting means for reformatting the received data packet into a complaint request comprising a destination address that correspond to a second destination address of the received data packet and a source address identifying a server;
   comparing means for comparing the address to a set of identifiers stored in a memory, each of the set of the identifiers identifying one of a plurality of digital processing devices, and each identifier being assigned a communication type;
   transmitting means for transmitting a query via a communication interface to a server to verify whether financial responsibility for a transaction will be accepted, and an account associated with the communication type should be adjusted; and
   adjusting means for adjusting the account associated with the communication type or another account based on the verification.

27. The method of claim 10, further comprising:
   wherein the receiving of the data packet further comprises receiving from a mobile communication terminal corresponding to an owner account with a wireless communication system, wherein the account comprises the owner account;
   wherein the transmitting of the query further comprises transmitting to an account holder of the owner account;
   receiving a positive response from the account holder; and
   wherein the adjusting the account or the another account further comprises adjusting the owner account in response to a positive response.

28. The method of claim 27, further comprising:
   receiving a negative response from the account holder;
   transmitting a subsequent query to a different account holder of a user account associated with a user of the mobile communication terminal to verify whether the user account should be adjusted based on the communication type, wherein the another account comprises the user account; and
   wherein the adjusting the account or the another account further comprises adjusting the user account based on a verification from the different account holder.

29. The method of claim 10, further comprising:
   wherein the address comprises a second address, and wherein the receiving of the data packet further comprises receiving a first address different from the second address and corresponding to the server;
   wherein the comparing of the address further comprises comparing of the second address;
   re-formatting the data packet, at an interface of the server, into a request having the second address as a destination address in response to the comparing of the second address to one of the set of identifiers; and
   transmitting the request to the destination address via the interface.

* * * * *